US010727459B2

(12) United States Patent
Yi

(10) Patent No.: US 10,727,459 B2
(45) Date of Patent: Jul. 28, 2020

(54) BATTERY TRAY

(71) Applicant: SAMSUNG SDI CO., LTD., Yongin-si, Gyeonggi-do (KR)

(72) Inventor: Jae-Ok Yi, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 507 days.

(21) Appl. No.: 15/315,473

(22) PCT Filed: Jun. 3, 2014

(86) PCT No.: PCT/KR2014/004971
§ 371 (c)(1),
(2) Date: Dec. 1, 2016

(87) PCT Pub. No.: WO2015/186849
PCT Pub. Date: Dec. 10, 2015

(65) Prior Publication Data
US 2017/0200928 A1    Jul. 13, 2017

(51) Int. Cl.
H01M 2/10    (2006.01)
B65D 25/10   (2006.01)
(Continued)

(52) U.S. Cl.
CPC ...... *H01M 2/1077* (2013.01); *B65D 21/0213* (2013.01); *B65D 25/107* (2013.01);
(Continued)

(58) Field of Classification Search
CPC .......... B65D 2585/88; B65D 1/24–246; B65D 25/107; B65D 21/0226; B65D 21/0238;
(Continued)

(56) References Cited

U.S. PATENT DOCUMENTS

2002/0195452 A1   12/2002   Apps
2003/0211382 A1   11/2003   Aoyama
(Continued)

FOREIGN PATENT DOCUMENTS

CN   1547542 A   11/2004
CN   2723369 Y    9/2005
(Continued)

OTHER PUBLICATIONS

Japanese Office Action dated Feb. 26, 2018, of the corresponding Japanese Patent Application No. 2016-569594.
(Continued)

*Primary Examiner* — Robert S Carrico
(74) *Attorney, Agent, or Firm* — Lee IP Law, PC

(57) ABSTRACT

The present invention relates a battery tray where rechargeable batteries are received.
According to one aspect of the present invention, a battery tray where a plurality of rechargeable batteries are received is provided. The battery tray includes: a first support wall and a second support wall that are disposed facing each other; a third support wall and a fourth support wall disposed facing each other, which connect an end of the first support wall and an end of the second support wall to each other; and a partition connected to an inner side of the third support wall and an inner side of the fourth support wall, wherein a first interior undercut is provided in the first support wall, a second interior undercut is provided in the second support wall, and the first interior undercut and the second interior undercut are asymmetrically disposed with reference to the partition.

17 Claims, 8 Drawing Sheets

(51) Int. Cl.
   *B65D 21/02* (2006.01)
   *B65D 1/24* (2006.01)
(52) U.S. Cl.
   CPC ................ *H01M 2/10* (2013.01); *B65D 1/24* (2013.01); *B65D 2585/88* (2013.01); *H01M 2220/20* (2013.01)
(58) Field of Classification Search
   CPC ... B65D 21/023; B65D 19/40; B65D 21/0213
   See application file for complete search history.

(56) References Cited

U.S. PATENT DOCUMENTS

| | | |
|---|---|---|
| 2005/0155889 A1 | 7/2005 | Lown |
| 2010/0196749 A1 | 8/2010 | Yoshida et al. |
| 2011/0262780 A1 | 10/2011 | Cohen |
| 2012/0048774 A1 | 3/2012 | Gingras et al. |
| 2012/0156539 A1 | 6/2012 | Honjo et al. |
| 2012/0223113 A1 | 9/2012 | Gaisne et al. |
| 2012/0301762 A1 | 11/2012 | Welker et al. |
| 2014/0079981 A1 | 3/2014 | Sheen et al. |

FOREIGN PATENT DOCUMENTS

| | | | |
|---|---|---|---|
| CN | 2849986 Y | | 12/2006 |
| CN | 102556467 A | | 7/2012 |
| CN | 202534713 U | | 11/2012 |
| CN | 102569693 B | | 10/2014 |
| JP | 06-037133 U | | 5/1994 |
| JP | 2000-006205 A | | 1/2000 |
| JP | 2000-072147 A | | 3/2000 |
| JP | 2004-103472 A | | 4/2004 |
| JP | 2006206074 A | * | 8/2006 |
| JP | 2007-161264 A | | 6/2007 |
| JP | 2011-244156 A | | 12/2011 |
| JP | 2012-206746 A | | 10/2012 |
| JP | 2012-254829 A | | 12/2012 |
| JP | 2013-214534 A | | 10/2013 |
| JP | 2014-022085 A | | 2/2014 |
| KR | 10-2010-0044418 A | | 4/2010 |
| KR | 10-2010-0057876 A | | 6/2010 |
| KR | 10-2012-0065025 A | | 6/2012 |
| WO | WO 2012/167269 A2 | | 12/2012 |

OTHER PUBLICATIONS

Extended European Search Report of the corresponding European Patent Application No. 14894124.8.
Chinese Office Action dated Dec. 29, 2018.
Japanese Notice of Allowance dated Jan. 28, 2019.
Chinese Office Action dated Nov. 13, 2019.
Malaysian Office Action dated Oct. 16, 2019.

* cited by examiner

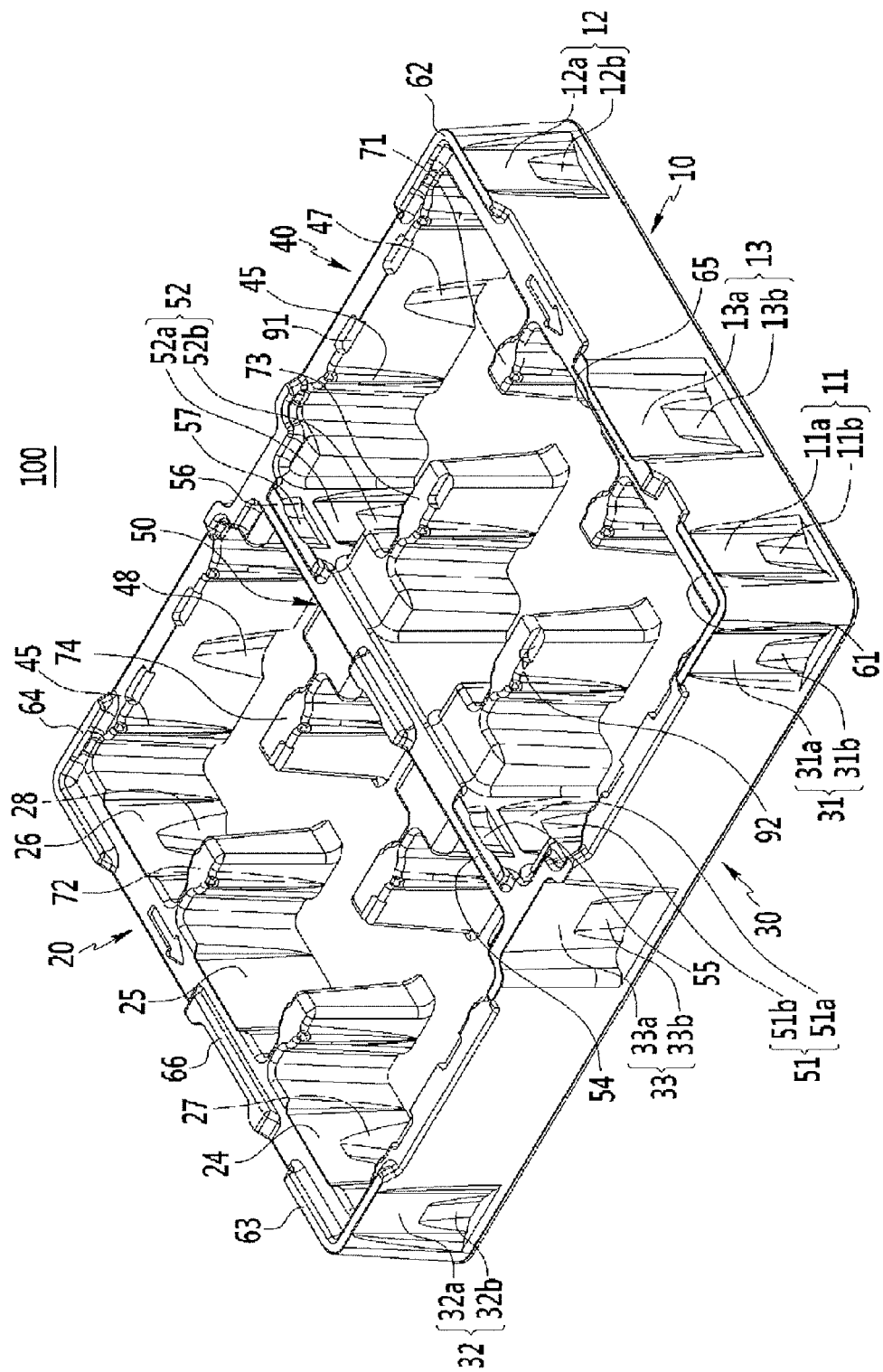
[FIG. 1]

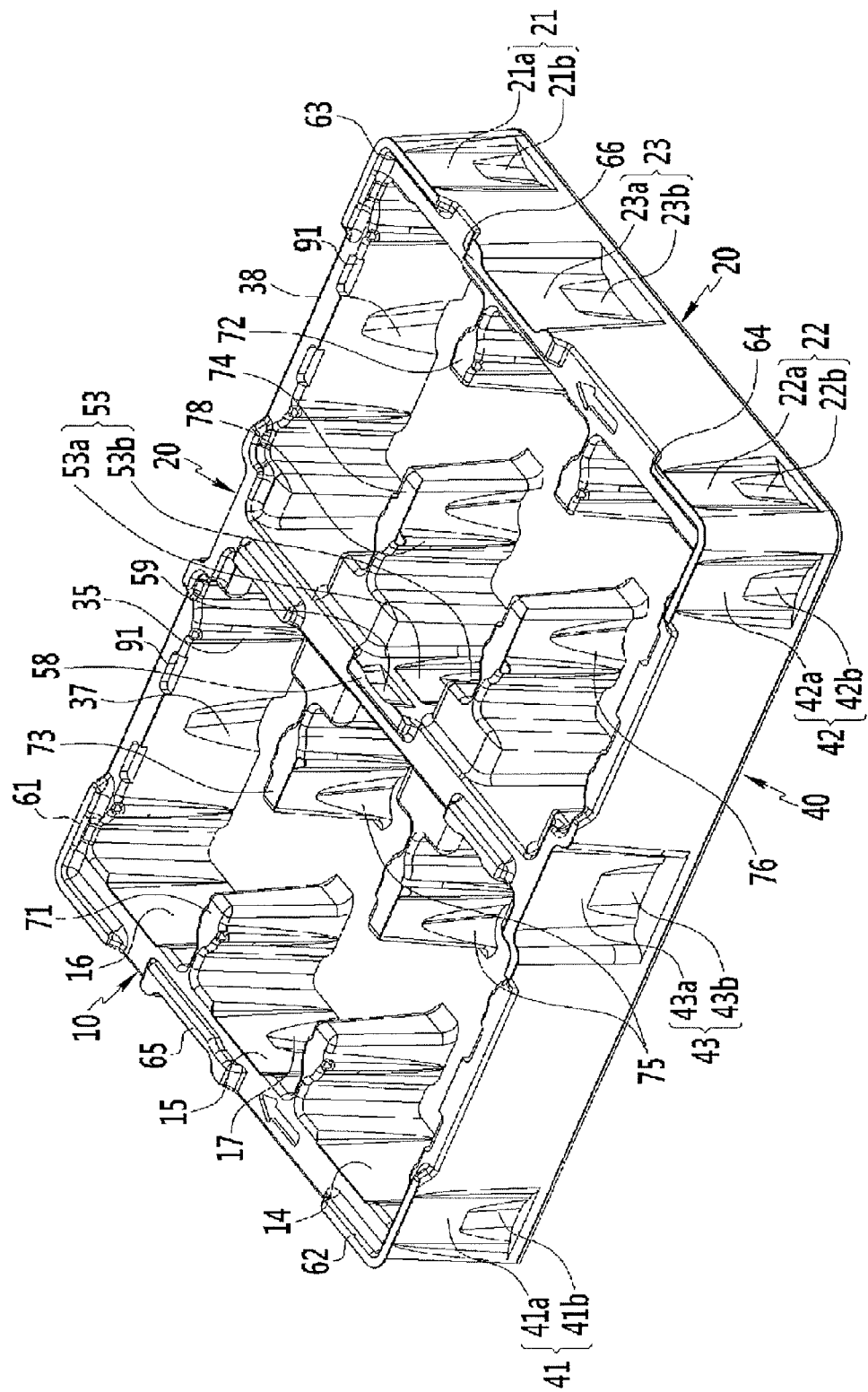
[FIG. 2]

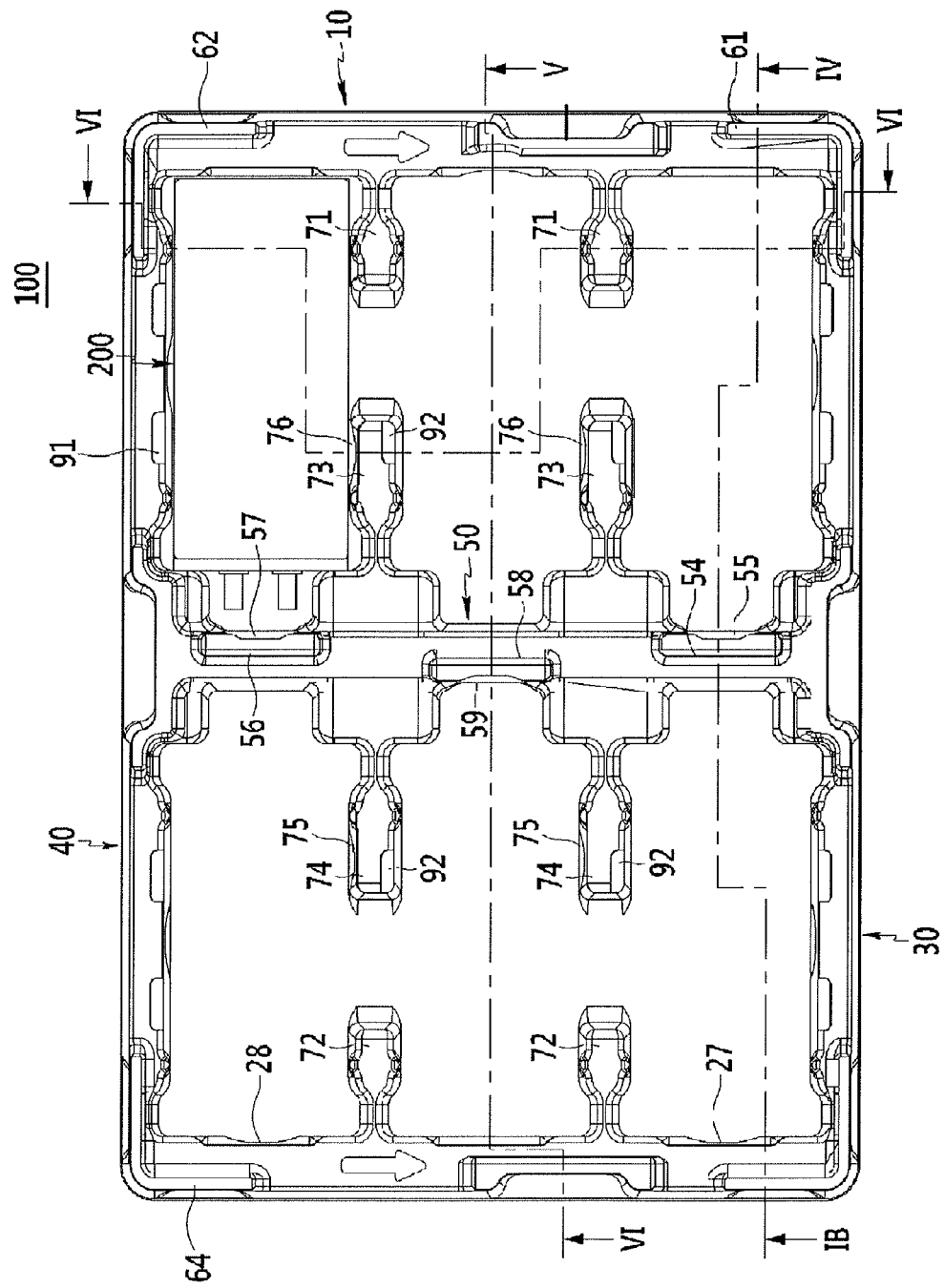
[FIG. 3]

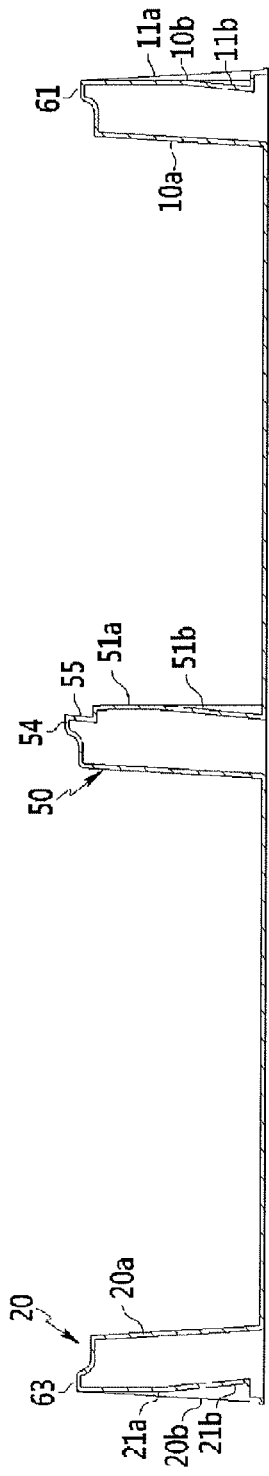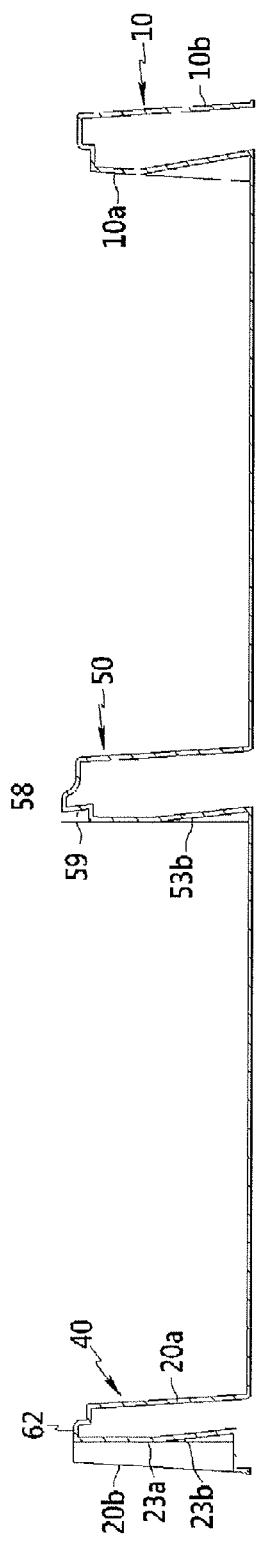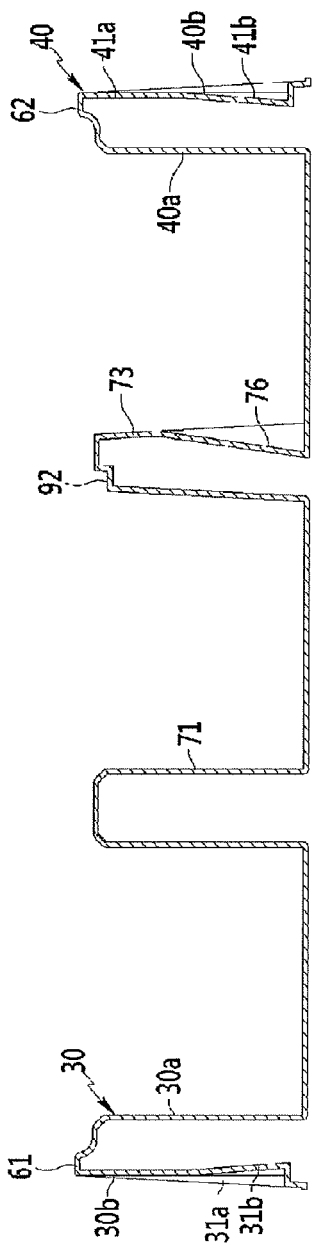

[FIG. 7]
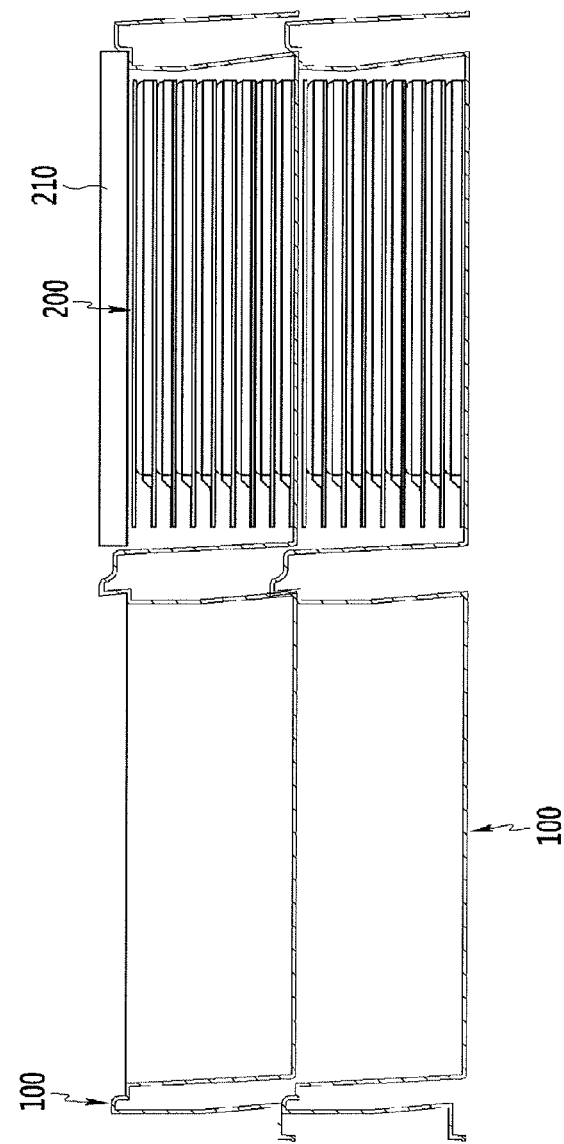

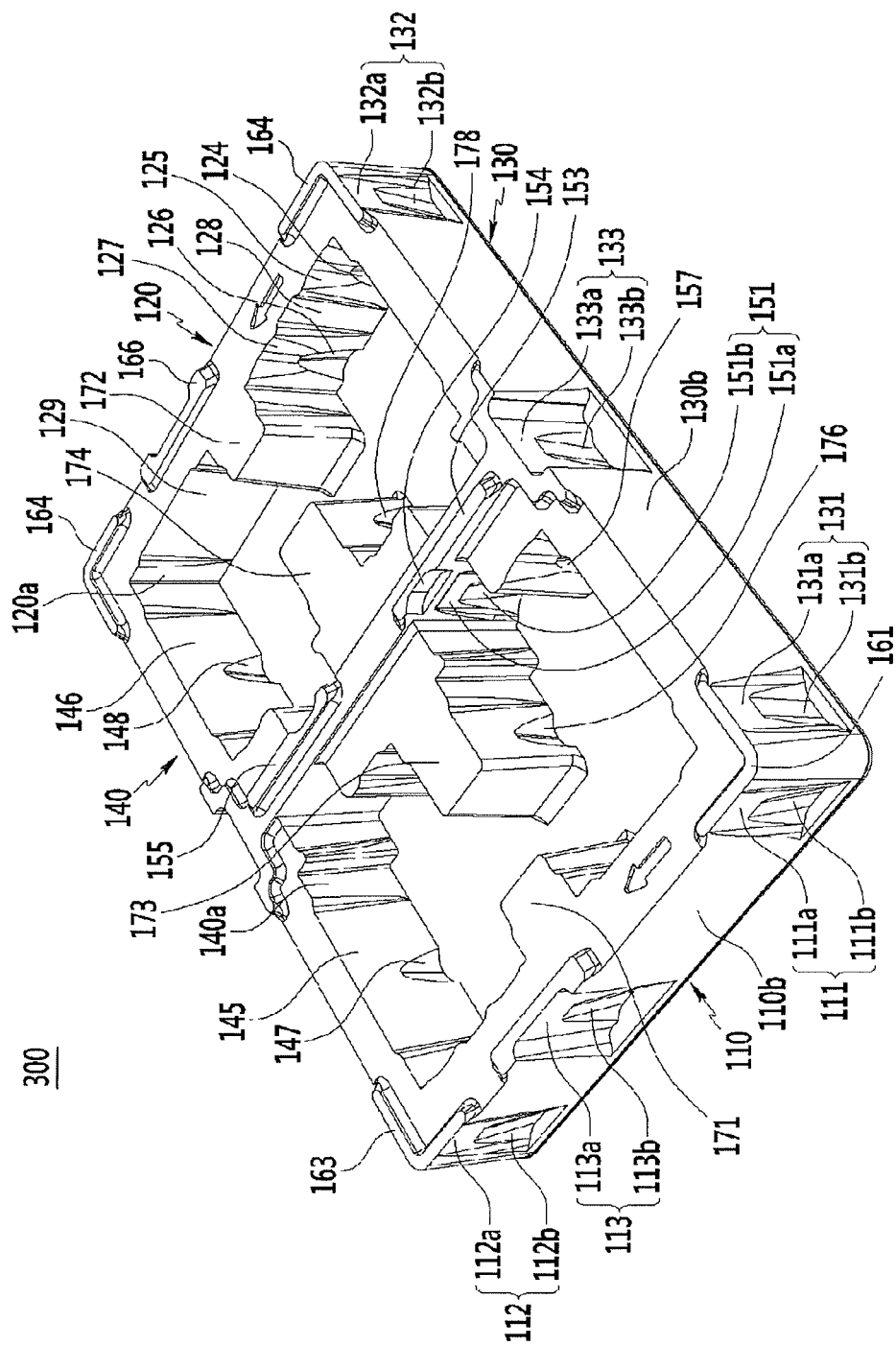
[FIG. 8]

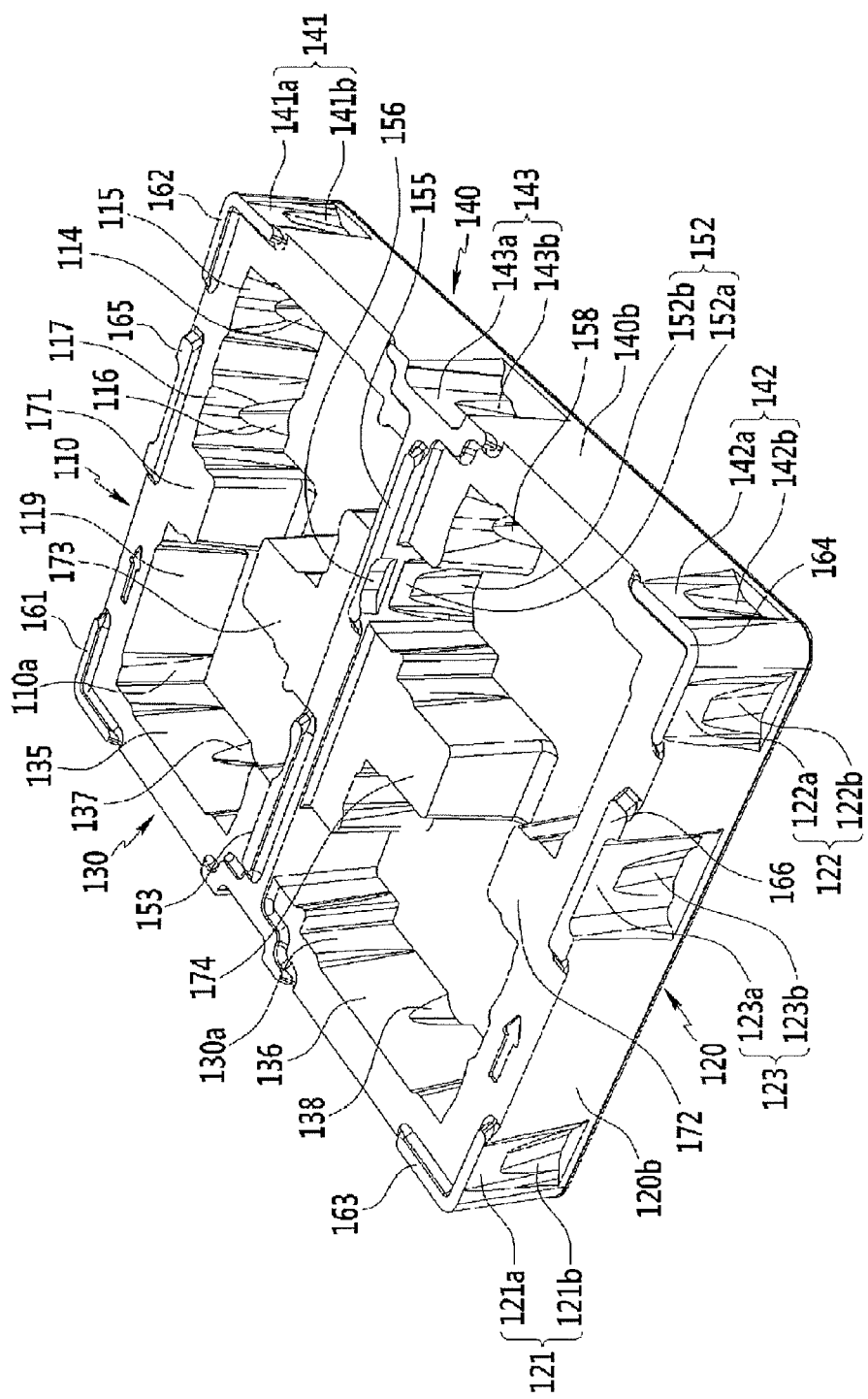
[FIG. 9]

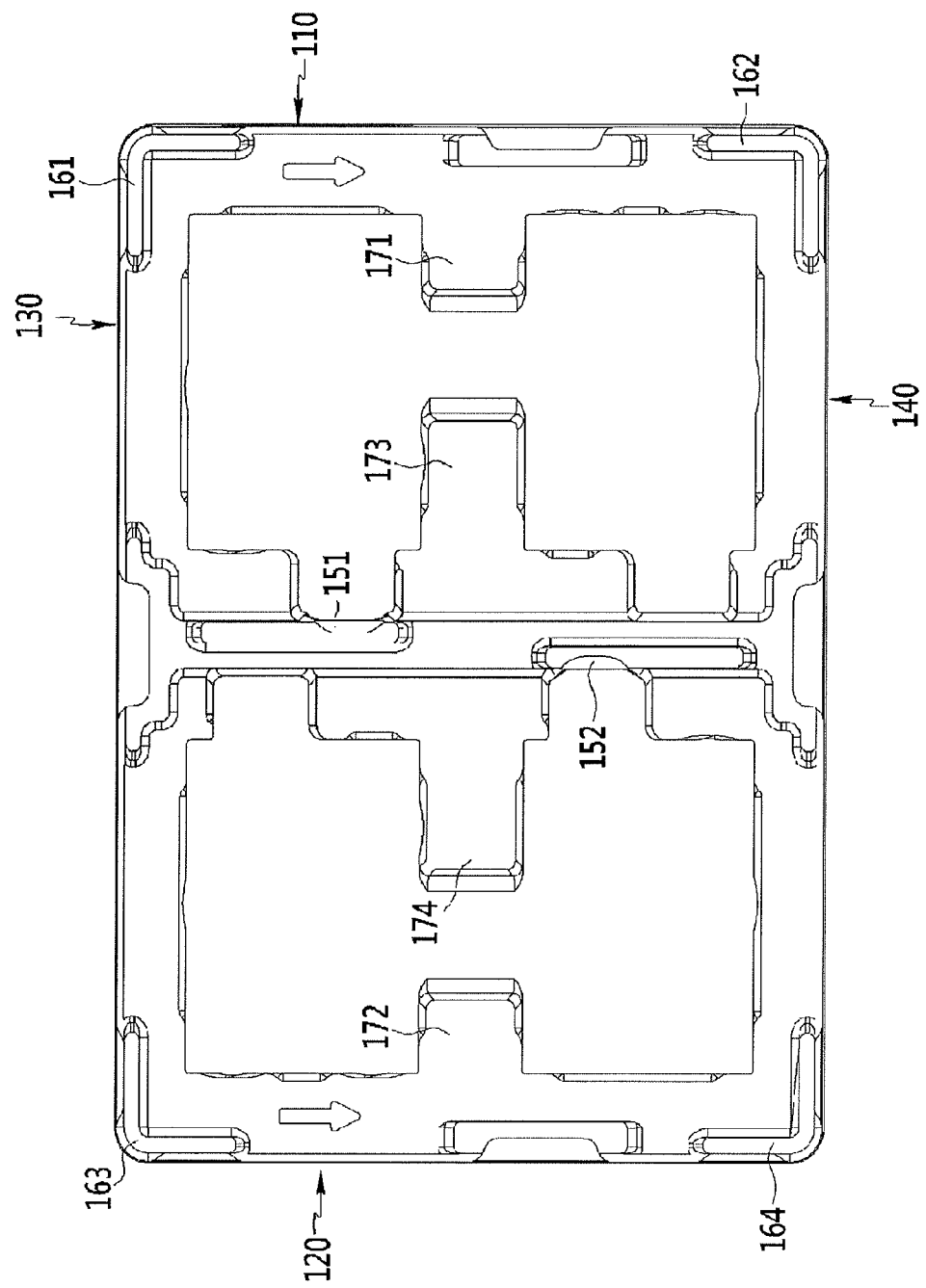
[FIG. 10]

US 10,727,459 B2

BATTERY TRAY

TECHNICAL FIELD

The present invention relates to a battery tray. More particularly, the present invention relates to a battery tray where a plurality of rechargeable batteries can be received.

BACKGROUND ART

Unlike a primary battery which is incapable of being recharged, a secondary battery (rechargeable battery) can be repeatedly charged and discharged. A low-capacity rechargeable battery is used as a power supply for small electronic devices such as cellular phones, notebook computers, and camcorders, while a medium or high-capacity rechargeable battery is used as a power supply for driving motors in hybrid vehicles and the like.

A high power rechargeable battery using a non-aqueous electrolyte of high energy density has been recently developed. A plurality of these rechargeable batteries can be coupled in series to form a large capacity battery module so that the high power rechargeable battery may be used to drive a device requiring high power (e.g., a motor in an electric vehicle).

Such a rechargeable battery is inserted into a tray for transport, and the thickness of the tray needs to be minimized for cost reduction and load reduction. However, when the thickness of the tray is minimized, strength of the tray is weakened so that the height of the tray is decreased. In addition, when the height of the tray is decreased, the number of batteries that can be received in a single tray is reduced.

DISCLOSURE

Technical Problem

The present invention has been made in an effort to provide a battery tray having improved strength.

Technical Solution

According to one aspect of the present invention, a battery tray where a plurality of rechargeable batteries are received is provided. The battery tray includes: a first support wall and a second support wall that are disposed facing each other; a third support wall and a fourth support wall disposed facing each other, which connect an end of the first support wall and an end of the second support wall to each other; and a partition connected to an inner side of the third support wall and an inner side of the fourth support wall, wherein a first interior undercut is provided in the first support wall, a second interior undercut is provided in the second support wall, and the first interior undercut and the second interior undercut are asymmetrically disposed with reference to the partition.

A third interior undercut may be provided in the third support wall, a fourth interior undercut is provided in the fourth support wall, and the third interior undercut and the fourth interior undercut may be symmetrical to each other with reference to a virtual line that perpendicularly passes the partition at the center of the partition.

Two of the third interior undercuts may be provided in the third support wall, and one of the third interior undercuts may be disposed between the first support wall and the partition while the other third interior undercut is disposed between the second support wall and the partition.

Two of the fourth interior undercuts may be provided in the fourth support wall, and one of the fourth interior undercuts may be disposed between the first support wall and the partition while the other fourth interior undercut is disposed between the second support wall and the partition.

In addition, two first protrusions that partition spaces where batteries are inserted may be provided protruding from the first support wall, and the first interior undercut may be disposed between the first protrusions.

Two third protrusions that face the first protrusions may be provided in sides of the partition, which face the first support wall, and a first center dual undercut may be provided between one of the third protrusions, provided in one side of the partition and the third support wall, and a second center dual undercut may be provided between the other third protrusion and the fourth support wall.

A support groove where a bottom of a first center dual undercut of a tray that is stacked above is inserted may be provided in an upper portion of the first center dual undercut, and a support groove where a bottom of a second center dual undercut of the tray stacked above is inserted may be provided in an upper portion of the second center dual undercut.

Two second protrusions that partition spaces where batteries are inserted may be provided by protruding from the second support wall, and the second interior undercuts may be respectively disposed between one of the second protrusion and the third support wall and between the other second protrusion and the fourth support wall.

Two fourth protrusions that face the second protrusions may be provided in a side of the partition, which faces the second support wall, and a third center dual undercut may be provided between the fourth protrusions.

A support groove where a bottom of a third center dual undercut of a tray that is stacked above is inserted may be provided in an upper portion of the third center dual undercut, and a first protrusion that partitions spaces where batteries are inserted may be provided by protruding from the first support wall, and the first interior undercut may be provided between the first protrusion and the fourth support wall.

A third protrusion that faces the first protrusion may be provided in a side of the partition, which faces the first support wall, and a center dual undercut may be provided between the third protrusion and the third support wall.

A second protrusion that partitions spaces where batteries are inserted may be provided by protruding from the second support wall, and the second interior undercut may be disposed between the second protrusion and the third support wall.

A fourth protrusion that faces the second protrusion may be provided in a side of the partition, which faces the second support wall, and a second center dual undercut may be provided between the fourth protrusion and the fourth support wall.

A support groove where a bottom of a center dual undercut of a tray that is stacked above is inserted may be provided in an upper portion of the center dual undercut, and a plurality of center support grooves may be provided in the partition, and the center support grooves may be provided an upper ends of lateral sides of the partition and they may be asymmetrical to each other with reference to the center of the partition.

The first support wall may include a first interior wall and a first exterior wall, the first interior undercut is provided in the first interior wall, a plurality of first exterior dual undercuts may be provided in the first exterior wall, and corner protrusions may be provided in upper portions of the first exterior dual undercuts.

The corner protrusions may be connected from an upper surface of the first support wall to an upper surface of the third support wall, and protrusions that contact side surfaces of the batteries may be respectively provided in the third support wall, the fourth support wall, the first protrusion, the second protrusion, the third protrusion, and the fourth protrusion.

Advantageous Effects

According to the exemplary embodiment of the present invention, the strength of the tray where a plurality of batteries are inserted can be improved, and the tray can be easily blown out from a mold.

DESCRIPTION OF THE DRAWINGS

FIG. 1 is a perspective view of a battery tray viewed from the front according to a first exemplary embodiment of the present invention.

FIG. 2 is a perspective view of the battery tray viewed from the rear according to the first exemplary embodiment of the present invention.

FIG. 3 is a top plan view of the battery tray according to the first exemplary embodiment of the present invention.

FIG. 4 is a cross-sectional view of FIG. 3, taken along the line IV-IV.

FIG. 5 is a cross-sectional view of FIG. 3, taken along the line V-V.

FIG. 6 is a cross-sectional view of FIG. 3, taken along the line VI-VI.

FIG. 7 is a cross-sectional view of a state in which batteries are inserted in layered battery trays.

FIG. 8 is a perspective view of a battery tray viewed from the front according to a second exemplary embodiment of the present invention.

FIG. 9 is a perspective view of the battery tray viewed from the rear according to the second exemplary embodiment of the present invention.

FIG. 10 is a top plan view of the battery tray according to the second exemplary embodiment of the present invention.

MODE FOR INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Like reference numerals indicate like components in the specification and drawings.

FIG. 1 is a perspective view of a battery tray viewed from the front according to a first exemplary embodiment of the present invention, FIG. 2 is a perspective view of the battery tray viewed from the rear according to the first exemplary embodiment of the present invention, and FIG. 3 is a top plan view of the battery tray according to the first exemplary embodiment of the present invention.

Referring to FIG. 1 to FIG. 3, a battery tray 100 according to the first exemplary embodiment of the present invention includes a first support wall 10, a second support wall 20, a third support wall 30, a fourth support wall 40, and a partition 50. The first support wall 10 and the second support wall 20 are disposed facing each other, and the third support wall 30 and the fourth support wall 40 connecting an end of the first support wall 10 and an end of the second support wall 20 and disposed facing each other. The partition 50 is connected to inner sides of the third and fourth support walls 30 and 40.

As shown in FIG. 4 and FIG. 5, the first support wall 10 includes a first interior wall 10a and a first exterior wall 10b, and the first interior wall 10a and the first exterior wall 10b are connected with each other through the upper surface of the first support wall 10. The first interior wall 10a faces the partition 50, and the first exterior wall 10b faces the first interior wall 10a but is disposed further outside than the first interior wall 10a. The upper surface of the first support wall 10 connects an upper end of the first interior wall 10a and an upper end of the first exterior wall 10b, and extends in a length direction of the first support wall 10 with a predetermined width.

A plurality of dual undercuts are provided in the first exterior wall 10b, and the plurality of dual undercuts include a first exterior dual undercut 11, a second exterior dual undercut 12, and a third exterior dual undercut 13 disposed between the first exterior dual undercut 11 and the second exterior dual undercut 12.

The first exterior dual undercut 11 includes a first exterior groove 11a that is concave inwardly and a second exterior groove 11b that is more concave inwardly from the first exterior groove 11a. An upper end of the second exterior groove 11b is formed to be lower than an upper end of the first exterior groove 11a, and a bottom of the second exterior groove 11b is connected with a bottom of the first exterior groove 11a. The first exterior groove 11a has a depth that is gradually increased downward, and the second exterior groove 11b also has a depth that is gradually increased downward. Accordingly, the bottom of the first exterior dual undercut 11 protrudes toward the first interior wall 10a.

The second exterior dual undercut 12 also includes a first exterior groove 12a and a second exterior groove 12b. The second exterior groove 12b is concave inwardly from the bottom of the first exterior groove 12a, and the bottom of the first exterior groove 12a and the bottom of the second exterior groove 12b are connected to each other in the same plane.

Meanwhile, the first exterior dual undercut 11 and the second exterior dual undercut 12 are disposed at opposite edges of the first exterior wall 10b, and the first exterior dual undercut 11 is disposed at a distance from a first exterior dual undercut 31 formed in the third support wall 30, interposing a rounded corner therebetween, and the second exterior dual undercut 12 is disposed at a distance from a first exterior dual undercut 41 formed in the fourth support wall 40, interposing a rounded corner therebetween.

The third exterior dual undercut 13 includes a first exterior groove 13a concave inwardly and a second exterior groove 13b concave more inwardly from the first exterior groove 13a. The first exterior groove 13a has a constant depth along a height direction, and the second exterior groove 13b has a depth that is gradually increased downward. An upper end of the second exterior groove 13b is lower than an upper end of the first exterior groove 13a, and a bottom of the second exterior groove 13b is connected with a bottom of the first exterior groove 13a. Accordingly, the bottom of the third exterior dual undercut 13 protrudes toward the first interior wall 10a.

A corner protrusion 61 is formed in an upper portion of the first exterior dual undercut 11, and the corner protrusion 61 extends to an upper surface of the third support wall 30 from an upper surface of the first support wall 10. The corner protrusion 61 supports the first exterior dual undercut 11 formed in the battery tray 100 that is disposed in a stacked manner by contacting the bottom of the first exterior dual undercut 11.

In addition, a corner protrusion 62 is formed in an upper portion of the second exterior dual undercut 12, and the corner protrusion 62 extends to an upper surface of the fourth support wall 40 from an upper surface of the first support wall 10. The corner protrusion 62 supports the second exterior dual undercut 12 formed in the battery tray 100 that is disposed in a stacked manner by contacting the bottom of the second exterior dual undercut 12. In addition, a center protrusion 65 is formed in an upper portion of the third exterior dual undercut 13, and the center protrusion 65 supports a third exterior dual undercut of a tray stacked above by contacting the bottom of the third exterior dual undercut.

As shown in FIG. 2, a first interior undercut 17 is formed in the first interior wall 10a, and the first exterior undercut 17 is disposed between first protrusions 71 protruded from the first support wall 10. The first protrusions 71 protrude toward the partition 50 in a first interior wall 10a and two first protrusions 71 are disposed at a distance from each other in the first interior wall 10a. The first protrusion 71 partitions spaces where batteries are inserted. Interior grooves 14, 15, and 16 are formed between the first protrusions 71 and between the first protrusions 71 and the support wall in the first interior wall 10a, and the interior grooves 14, 15, and 16 have bottoms that are inclined toward an outer side with respect to the first interior wall 10a. The first exterior undercut 17 is formed in a lower portion of the interior groove 15 that is disposed in the center thereof, and the bottom of the first interior undercut 17 is supported by an upper surface of a first support wall 10 of the tray that is stacked below.

The second support wall 20 includes a second interior wall 20a and a second exterior wall 20b, and the second interior wall 20a and the second exterior wall 20b are connected with each other through upper surfaces thereof. The second interior wall 20a faces the partition 50, and the second exterior wall 20b is disposed further outside than the second interior wall 20a while facing the second interior wall 20a. An upper surface of the second support wall 20 connects an upper end of the second interior wall 20a and an upper end of the second exterior wall 20b, and extends in a length direction of the second support wall 20 with a predetermined width.

A plurality of exterior dual undercuts are formed in the second exterior wall 20b, and the plurality of exterior dual undercuts include a first exterior dual undercut 21, a second exterior dual undercut 22, and a third exterior dual undercut 23 disposed between the first exterior dual undercut 21 and the second exterior dual undercut 22.

The first exterior dual undercut 21 includes a first exterior groove 21a concave inwardly and a second exterior groove 21b more concave inwardly from the first exterior groove 21a. An upper end of the second exterior groove 21b is lower than an upper end of the first exterior groove 21a, and a bottom of the second exterior groove 21b is connected with a bottom of the first exterior groove 21a. The first exterior groove 21a has a depth that is gradually increased downward, and the second exterior groove 21b also has a depth that is gradually increased downward. Accordingly, the bottom of the first exterior dual undercut 21 protrudes toward the second interior wall 20a.

The second exterior dual undercut 22 also includes a first exterior groove 22a and a second exterior groove 22b. The second exterior groove 22b is concave inwardly from the bottom of the first exterior groove 22a, and the bottom of the first exterior groove 22a and the bottom of the second exterior groove 22b are connected with each other in the same plane.

Meanwhile, the first exterior dual undercut 21 and the second exterior dual undercut 22 are disposed at opposite edges of the second exterior wall 20b, and the first exterior dual undercut 21 is disposed at a distance from the second exterior dual undercut 32 formed in the third support wall 30, interposing a rounded corner therebetween, and the second exterior dual undercut 22 is disposed at a distance from a second exterior dual undercut 42 formed in the fourth support wall 40, interposing a rounded corner therebetween.

The third exterior dual undercut 23 includes a first exterior groove 23a concave inwardly and a second exterior groove 23b concave more inwardly from the first exterior groove 23a. The first exterior groove 23a has a constant depth along a length direction, and the second exterior groove 23b has a depth that is gradually increased downward. An upper end of the second exterior groove 23b is lower than an upper end of the first exterior groove 23a, and a bottom of the second exterior groove 23b is connected with a bottom of the first exterior groove 23a. Accordingly, the bottom of the third exterior dual undercut 23 protrudes toward the second interior wall 20a.

A corner protrusion 63 is formed in an upper portion of the first exterior dual undercut 21, and the corner protrusion 63 extends to the upper surface of the third support wall 30 from the upper surface of the second support wall 20. The corner protrusion 63 supports the first exterior dual undercut 21 formed in the stacked battery tray 100 by contacting the bottom of the first exterior dual undercut 21.

In addition, a corner protrusion 64 is protruded in an upper portion of the second exterior dual undercut 22, and the corner protrusion 64 is connected to the upper surface of the fourth support wall 40 from the upper surface of the second support wall 20. The corner protrusion 64 supports the second exterior dual undercut 22 formed in the battery tray disposed in a stacked manner by contacting the bottom of the second exterior dual undercut 22. In addition, a center protrusion 66 is formed in an upper portion of the third exterior dual undercut 23, and the center protrusion 66 supports a third exterior dual undercut of a tray that is stacked below by contacting the bottom of the third exterior dual undercut.

Second interior undercuts 27 and 28 are formed in the second interior wall 20a, and the second interior undercut 27 is disposed between a second protrusion 72 protruded from the second support wall 20 and the third support wall 30, and the second interior undercut 28 is disposed between the second protrusion 72 and the fourth support wall 40. The bottoms of the second interior undercuts 27 and 28 are supported by an upper surface of the second support wall 20 of the tray that is stacked below.

Accordingly, the first exterior undercut 17 is asymmetrical to the second interior undercuts 27 and 28 with reference to the partition 50. As described above, when the interior walls are asymmetrically formed, a load is dispersed and thus the tray can be stably supported and the tray 100 can be easily blown down from a mold.

The second protrusion 72 protrudes toward the partition 50 from the second interior wall 20a, and two second protrusions 72 are disposed at a distance from each other in the second interior wall 20a. The second protrusions 72 partition spaces where batteries are inserted. In the second interior wall 20a, interior grooves 24, 25, and 26 are provided between the second protrusions 72 and between the second protrusions 72 and the support wall, and the interior grooves 24, 25, and 26 have bottoms that are inclined toward an outer side with respect to the second interior wall 20a.

As shown in FIG. 1 and FIG. 6, the third support wall 30 includes a third interior wall 30a and a third exterior wall 30b, and the third interior wall 30a and the third exterior wall 30b are connected with each other through upper surfaces thereof. The third exterior wall 30b is disposed more outer than the third interior wall 30a while facing the third interior wall 30a. The upper surface connects an upper end of the third interior wall 30a and an upper end of the third exterior wall 30b, and extends in a length direction of the third support wall 30 with a predetermined width.

A plurality of exterior dual undercuts are formed in the third exterior wall 30b, and the plurality of exterior dual undercuts include a first exterior dual undercut 31, the second exterior dual undercut 32, and a third exterior dual undercut 33 disposed between the first exterior dual undercut 31 and the second exterior dual undercut 32.

The first exterior dual undercut 31 includes a first exterior groove 31a concave inwardly and a second exterior groove 31b concave more inwardly from the first exterior groove 31a. An upper end of the second exterior groove 31b is lower than an upper end of the first exterior groove 31a, and a bottom of the second exterior groove 31b is connected with a bottom of the first exterior groove 31a. The first exterior groove 31a has a depth that is gradually increased downward, and the second exterior groove 31b also has a depth that is gradually increased downward. Accordingly, the bottom of the first exterior dual undercut 31 protrudes toward the third interior wall 30a.

The second exterior dual undercut 32 includes a first exterior groove 32a and a second exterior groove 32b. The second exterior groove 32b is concave inwardly from a bottom of the first exterior groove 32a, and the bottom of the first exterior groove 32a and a bottom of the second exterior groove 32b are connected with each other in the same plane. The first exterior dual undercut 31 and the second exterior dual undercut 32 are disposed at opposite edges of the third exterior wall 30b.

Meanwhile, the third exterior dual undercut 33 includes a first exterior groove 33a concave inwardly and a second exterior groove 33b concave more inwardly from the first exterior groove 33a. The first exterior groove 33a has a constant depth in a length direction, and the second exterior groove 33b has a depth that is gradually increased downward. An upper end of the second exterior groove 33b is lower than an upper end of the first exterior groove 33a, and a bottom of the second exterior groove 33b is connected with a bottom of the first exterior groove 33a. Accordingly, the bottom of the third exterior dual undercut 33 protrudes toward the third interior wall 30a. The third exterior dual undercut 33 is disposed in a portion where the third support wall 30 and the partition 50 are connected with each other.

The corner protrusion 61 is formed protruding in an upper portion of the first exterior dual undercut 31, and the corner protrusion 61 supports the first exterior dual undercut 31 that is formed in the stacked battery layer 100 by contacting the bottom of the exterior dual undercut 31.

In addition, the corner protrusion 63 is formed in an upper portion of the second exterior dual undercut 32, and the corner protrusion 63 supports the second exterior dual undercut 32 in the stacked battery tray by contacting the bottom of the second exterior dual undercut 32. Further, the bottom of the third exterior dual undercut 33 is supported by an upper surface of the tray that is stacked below by contacting the same.

Third interior undercuts 37 and 38 are provided in the third interior wall 30a, and the third interior undercut 37 is disposed between the first support wall and the partition 50 while the third interior undercut 38 is disposed between the second support wall 20 and the partition 50. Bottoms of the third interior undercuts 37 and 38 are supported by an upper surface of a third support wall 30 of a tray that is stacked below.

A plurality of support protrusions 35 are formed in the third interior wall 30a, and each support protrusion 35 is extended in a height direction of the third interior wall 30a. The plurality of support protrusions 35 contact side surfaces of batteries to prevent the batteries from moving.

The fourth support wall 40 includes a fourth interior wall 40a and a fourth exterior wall 40b, and the fourth interior wall 40a and the fourth exterior wall 40b are connected with each other through an upper surface of the fourth support wall 40. The fourth exterior wall 40b faces the fourth interior wall 40a but is disposed more outside than the fourth interior wall 40a. The upper surface of the fourth support wall 40 connects an upper end of the fourth interior wall 40a and an upper end of the fourth exterior wall 40b, and extends in a length direction of the fourth support wall 40a with a predetermined width.

A plurality of exterior dual undercuts are provided in the fourth exterior wall 40b, and the plurality of exterior dual undercuts include the first exterior dual undercut 41, the second exterior dual undercut 42, and a third exterior dual undercut 43 that is disposed between the first exterior dual undercut 41 and the second exterior dual undercut 42.

The first exterior dual undercut 41 includes a first exterior groove 41a concave inwardly and a second exterior groove 41b concave more inwardly from the first exterior groove 41a. An upper end of the second exterior groove 41b is lower than an upper end of the first exterior groove 41a, and a bottom of the second exterior groove 41b is connected with a bottom of the first exterior groove 41a. The first exterior groove 41a has a depth that is gradually increased downward, and the second exterior groove 41b also has a depth that is gradually increased downward. Accordingly, the bottom of the first exterior dual undercut 41 protrudes toward the fourth interior wall 40a.

The second exterior dual undercut 42 includes a first exterior groove 42a and a second exterior groove 42b. The second exterior groove 42b is concave inwardly from a bottom of the first exterior groove 42a, and the bottom of the first exterior groove 42a and a bottom of the second exterior groove 42b are connected with each other. The first exterior dual undercut 41 and the second exterior dual undercut 42 are disposed at opposite edges of the fourth exterior wall 40b.

Meanwhile, the third exterior dual undercut 43 includes a first exterior groove 43a concave inwardly and a second exterior groove 43b concave more inwardly from the first exterior groove 43a. The first exterior groove 43a has a constant depth in a height direction, and the second exterior groove 43b has a depth that is gradually increased downward. An upper end of the second exterior groove 43b is lower than an upper end of the first exterior groove 43a, and a bottom of the second exterior groove 43b is connected with a bottom of the first exterior groove 43a. Accordingly, the bottom of the third exterior dual undercut 43 protrudes toward the third interior wall 40a. The third exterior dual undercut 43 is disposed in a portion where the fourth support wall 40 and the partition 50 are connected with each other.

The corner protrusion 62 is provided in an upper portion of the first exterior dual undercut 41, and the corner protrusion 62 supports the first exterior dual undercut 41 formed in the stacked battery tray 100 by contacting the bottom of the first exterior dual undercut 41.

In addition, the corner protrusion 64 is also provided in an upper portion of the second exterior dual undercut 42, and the corner protrusion 64 supports the second exterior dual undercut 42 formed in the stacked battery tray 100 by contacting the bottom of the second exterior dual undercut 42. In addition, the bottom of the third exterior dual undercut 43 is supported by contacting an upper surface of the tray that is stacked below.

Fourth interior undercuts 47 and 48 are provided in the fourth interior wall 40a, and the fourth interior undercut 47 is disposed between the first support wall 10 and the partition 50 while the fourth interior undercut 48 is disposed between the second support wall 20 and the partition 50. Bottoms of the fourth interior undercuts 47 and 48 are supported by an upper surface of the fourth support wall 40 of the tray that is stacked below.

The fourth interior undercuts 47 and 48 and the third interior undercuts 37 and 38 are disposed to be symmetrical to each other with respect to a virtual line that perpendicularly passes the partition 50 at the center of the partition 50.

Meanwhile, a plurality of support protrusions 45 are provided in the fourth interior wall 40a, and the support protrusions 45 are connected with each other along a height direction of the fourth interior wall 40a. The support protrusions 45 contact side surfaces of batteries to thereby prevent the batteries from moving.

Threshold grooves 91 are provided in an upper surface of each of the third support wall 30 and the fourth support wall 40, and the threshold grooves 91 indicate the maximum height of a battery stack. When the threshold grooves 91 are provided, it can be easily observed with the naked eye whether the number of stacked batteries in a tray exceeds a predetermined number.

The partition 50 partitions spaces by connecting the center of the third support wall 30 and the center of the fourth support wall 40, and is disposed in parallel with the first support wall 10 and the second support wall 20. A third protrusion 73 protruding toward the first support wall 10 and a fourth protrusion 74 protruding toward the second support wall 20 are provided in the partition 50. Two of the third protrusions 73 are provided in the partition 50, and the third protrusions 73 are disposed in parallel with the first protrusions 71 while facing the first protrusions 71.

In addition, two of the fourth protrusions 74 are provided in the partition 50, and the fourth protrusions 74 are disposed in parallel with the second protrusions 72 while facing the second protrusions 72. That is, the third protrusions 73 and the fourth protrusions 74 respectively protrude from different surfaces of the partition 50. The third protrusions 73 and the first protrusions 71 are disposed at a distance from each other, and the fourth protrusions 74 are disposed at a distance from the second protrusions 72.

As shown in FIG. 2, middle undercuts 75 are provided only in sides of the third protrusions 73, which face the fourth support wall 40, and middle undercuts 76 are provided only in sides of the fourth protrusions 74, which face the fourth support wall 40. That is, the middle undercut 75 is formed only in one side of the third protrusions 73, and the middle undercut 76 is formed only in one side of the fourth protrusions 74. A bottom of each of the middle undercuts 75 is supported by an upper surface of a third protrusion 73 disposed therebelow, and a bottom of each of the middle undercuts 76 is supported by an upper surface of a fourth protrusion 74 disposed therebelow.

Support protrusions 78 are respectively provided in the first protrusions 71, the second protrusions 72, the third protrusions 73, and the fourth protrusions 74, and the support protrusions 78 are connected with the respective protrusions 71, 72, 73, and 74 in their height directions. The support protrusions 78 contact side surfaces of the batteries 20 thereby preventing the batteries 200 from moving.

A first center dual undercut 51 is provided in a side of the partition 50, which faces the first support wall 10, between one of the third protrusions 73 and the third support wall 30, and a second center dual undercut 52 is provided in the side of the partition 50 between the other third protrusion 73 and the fourth support wall 40.

The first center dual undercut 51 includes a first interior groove 51a concave inwardly and a second interior groove 51b concave more inwardly from the first interior groove 51a. An upper end of the second interior groove 51b is lower than an upper end of the first interior groove 51a, and a bottom of the second interior groove 51b is connected with a bottom of the first interior groove 51a. The first interior groove 51a has a depth that is gradually increased downward, and the second interior groove 51b also has a depth that is gradually increased downward. Accordingly, the bottom of the first center dual undercut 51 protrudes in a sideward direction.

A first interior protrusion 54 protrudes from an upper portion of the first center dual undercut 51, and a first receiving groove 55 where a bottom of a first center dual undercut of a tray that is stacked above is inserted is provided in the first interior protrusion 54. The first receiving groove 55 has opened sides that respectively face above and the first support wall 10.

The second center dual undercut 52 includes a first interior groove 52a that is concave inwardly and a second interior groove 52b that is concave more inwardly from the first interior groove 52a. An upper end of the second interior groove 52b is lower than an upper end of the first interior groove 52a, and a bottom of the second interior groove 52b is connected with a bottom of the first interior groove 52a. The first interior groove 52a has a depth that is gradually increased downward, and the second interior groove 52b also has a depth that is gradually increased downward. Accordingly, the bottom of the second center dual undercut 52 protrudes in a sideward direction.

A second interior protrusion 56 protrudes from an upper portion of the center dual undercut 52, and a second receiving groove 57 where a bottom of a second center dual undercut of the tray that is stacked above is inserted is provided in the second interior protrusion 56. The second receiving groove 57 has opened sides that respectively face above and the first support wall 10.

A third center dual undercut 53 is provided in a side of the second support wall 20 in the partition 50, which faces the second support wall 20, between the third protrusions 73.

The third center dual undercut 53 includes a first interior groove 53a that is concave inwardly and a second interior groove 53b that is concave more inwardly from the first interior groove 53a. An upper end of the second interior groove 53b is lower than an upper end of the first interior groove 53a, and a bottom of the second interior groove 53b is connected with a bottom of the first interior groove 53a. The first interior groove 53a has a depth that is gradually increased downward, and the second interior groove 53b also has a depth that is gradually increased downward. Accordingly, the bottom of the third center dual undercut 53 protrudes in a sideward direction.

A third interior protrusion 58 protrudes from an upper portion of the third center dual undercut 53, and a third receiving groove 59 where a bottom of a third center dual undercut of the tray that is stacked above is inserted is provided in the second interior protrusion 58. The third receiving groove 59 has opened sides that respectively face above and the second support wall 20.

As described above, the first receiving groove 55 and the second receiving groove 57 are opened toward the first support wall 10 and the third receiving groove 59 is opened toward the second support wall 20, and thus, when center dual undercuts of a tray disposed above are supported by the receiving grooves, a load of the tray can be dispersed and the interior grooves support the tray 100 in lateral directions to guide the tray 100 to be placed in a desired location.

As described, according to the present exemplary embodiment, a plurality of dual undercuts are provided in the exterior wall, thereby stably supporting the load of the tray. Since the dual undercut can support a heavier load than a single undercut, the exterior wall can stably support a load of a tray disposed thereabove. In addition, when the single undercut is increased in size, a tray cannot be easily blown out from a mold. However, when the dual undercut is formed, the tray can be detached in phases so that the tray can be more easily blown out from the mold.

Further, as shown in FIG. 7, a plurality of batteries 200 are inserted in a stacked manner in the tray 100, and a buffer cover 210 that is made of a polymer is provided on the uppermost battery. Since the load of the tray can be dispersed and supported by the plurality of exterior dual undercuts, interior undercuts, and middle undercuts provided in the support walls and the partition, the load of the tray can be stably supported.

FIG. 8 is a perspective view of a battery tray viewed from a front according to a second exemplary embodiment of the present invention, FIG. 9 is a perspective view of the battery tray viewed from a rear according to the second exemplary embodiment of the present invention, and FIG. 10 is a top plan view of the battery tray according to the second exemplary embodiment of the present invention.

Referring to FIG. 8 to FIG. 10, a tray 300 according to the present exemplary embodiment includes a first support wall 110, a second support wall 120, a third support wall 130, a fourth support wall 140, and a partition 150. The first support wall 110 and the second support wall 120 are disposed facing each other, the third support wall 130 and the fourth support wall 140 are disposed facing each other while connecting an end of the first support wall 110 and an end of the second support wall 130, and the partition 150 is connected to an inner side of the third support wall 130 and an inner side of the fourth support wall 140.

The first support wall 110 includes a first interior wall 110*a* and a first exterior wall 110*b*, and the first interior wall 110*a* and the first exterior wall 110*b* are connected with each other through upper sides thereof. The first interior wall 110*a* faces the partition 150, and the first exterior wall 110*b* is disposed further outside than the first interior wall 110*a* while facing the first interior wall 110*a*.

A plurality of exterior dual undercuts are provided in the first exterior wall 110*b*, and a first exterior dual undercut 111, a second exterior dual undercut 112, and a third exterior dual undercut 113 are provided in the first exterior wall 110*b*. The third exterior dual undercut 113 is disposed between the first exterior dual undercut 111 and the second exterior dual undercut 112.

The first exterior dual undercut 111 includes a first exterior groove 111*a* that is concave inwardly and a second exterior groove 111*b* that is concave more inwardly from the first exterior groove 111*a*. The second exterior dual undercut 112 includes a first exterior groove 112*a* that is concave inwardly and a second exterior groove 112*b* that is concave more inwardly from the first exterior groove 112*a*. The third exterior dual undercut 113 includes a first exterior groove 113*a* that is concave inwardly and a second exterior groove 113*b* that is concave more inwardly from the first exterior groove 113*a*.

A corner protrusion 161 is provided in an upper portion of the first exterior dual undercut 111, and the corner protrusion 161 is connected from an upper surface of the first support wall 110 to an upper surface of the third support wall 130. The corner protrusion 161 contacts a bottom of a first exterior dual undercut 111 of a tray 300 that is stacked above.

In addition, a corner protrusion 162 is provided in an upper portion of the second exterior dual undercut 112, and the corner protrusion 162 is connected from an upper surface of the first support wall 110 to an upper surface of the fourth support wall 140. The corner protrusion 162 contacts a bottom of a second exterior dual undercut 112 of the tray 300 that is stacked above.

A center protrusion 165 is provided in an upper portion of the third exterior dual undercut 113, and the center protrusion 165 supports a tray 300 that is stacked above by contacting a bottom of the third exterior dual undercut 113 of the tray 300.

A first protrusion 171 is provided in the first interior wall 110*a*, and the first protrusion 171 protrudes toward the partition 150 in the first interior wall 110*a*, and one protrusion is formed in the first interior wall 110*a*. The first protrusion 171 divides spaces where batteries are inserted.

An interior groove 119 is provided in the first interior wall 110*a*, and the interior groove 119 is formed as a groove having a bottom that is inclined to the outside with respect to the first interior wall 11*a*. The interior groove 119 is provided between the first protrusion 171 and the third support wall 130.

In the first interior wall 110*a*, first interior undercuts 114 and 116 are provided between the first protrusion 171 and the fourth support wall 140. The two first exterior undercuts 114 and 116 are distanced from each other, interposing an interior groove 118 therebetween, and an upper groove 115 is provided in an upper portion of the first interior undercut 114 and an upper groove 117 is provided in an upper portion of the first interior undercut 116. However, a depth of each of the upper grooves 115 and 117 is less deep than a depth of each of the first interior undercuts 114 and 116, and a bottom of each of the first interior undercuts 115 and 117 is supported by an upper surface of a first support wall 110 of a tray 300 disposed therebelow.

The second support wall 120 includes a second interior wall 120*a* and a second exterior wall 120*b*, and the second interior wall 120*a* and the second exterior wall 120*b* are connected with each other through upper surfaces thereof. The second interior wall 120*a* faces the partition 150, and the second exterior wall 120*b* is disposed further outside than the second interior wall 120*a* while facing the second interior wall 120*a*.

A plurality of exterior dual undercuts are provided in the second exterior wall 120*b*, and a first exterior dual undercut 121, a second exterior dual undercut 122, and a third exterior dual undercut 123 are provided in the second exterior wall 120b. The third exterior dual undercut 123 is disposed between the first exterior dual undercut 121 and the second exterior dual undercut 122.

The first exterior dual undercut 121 includes a first exterior groove 121a that is concave inwardly and a second exterior groove 121b that is concave more inwardly from the first exterior groove 121a. The second exterior dual undercut 122 includes a first exterior groove 122a that is concave inwardly and a second exterior groove 122b that is concave more inwardly from the first exterior groove 122a. The third exterior dual undercut 123 includes a first exterior groove 123a that is concave inwardly and a second exterior groove 123b that is concave more inwardly from the first exterior groove 123a.

A corner protrusion 163 is provided in an upper portion of the first exterior dual undercut 121, and the corner protrusion 163 is connected from an upper surface of the second support wall 120 to an upper surface of the third support wall 130. The corner protrusion 163 contacts a bottom of a first exterior dual undercut 121 of the tray 300 that is stacked above.

In addition, a corner protrusion 164 is provided in an upper portion of the second exterior dual undercut 122, and the corner protrusion 164 is connected from an upper surface of the second support wall 120 to an upper surface of the fourth support wall 140. The corner protrusion 164 contacts a bottom of a second exterior dual undercut 122 of the tray 300 that is stacked above.

A center protrusion 166 is provided in an upper portion of the third exterior dual undercut 123, and the center protrusion 166 supports the tray 300 that is stacked above by contacting a bottom of a third exterior dual undercut 123 of the above-disposed tray 1300.

Meanwhile, a second protrusion 172 is provided in the second interior wall 120a, and the second protrusion 172 protrudes toward the partition 150 from the second interior wall 120a and one protrusion is formed in the second interior wall 120a. The second protrusion 172 divides spaces where batteries are inserted.

An interior groove 129 is provided in the second interior wall 120a, and the interior groove 129 has a bottom that is inclined toward an outer side with respect to the second interior wall 120a. The interior groove 129 is disposed between the second protrusion 172 and the fourth support wall 140.

In the second interior wall 120a, second interior undercuts 124 and 126 are provided between the second protrusion 172 and the third support wall 130. The two first exterior undercuts 124 and 126 are distanced from each other, interposing the interior groove 128 therebetween, and an upper groove 125 is provided in an upper portion of the second interior undercut 124 and an upper groove 127 is provided in an upper portion of the second interior undercut 126. A depth of each of the upper grooves 125 and 127 is less deep than a depth of each of the second interior undercuts 124 and 126, and a bottom of each of the second interior undercuts 124 and 126 is supported by an upper surface of a second support wall of a tray 300 disposed therebelow.

The third support wall 130 includes a third interior wall 130a and a third exterior wall 130b, and the third interior wall 130a and the third exterior wall 130b are connected with each other through upper surfaces thereof. The third exterior wall 130b is disposed further outside than the third interior wall 130a while facing the third interior wall 130a.

Since a plurality of exterior dual undercuts are provided in the third exterior wall 130b, a first exterior dual undercut 131, a second exterior dual undercut 132, and a third exterior dual undercut 133 are provided in the third exterior wall 130b. The third exterior dual undercut 133 is disposed between the first exterior dual undercut 131 and the second exterior dual undercut 132.

The first exterior dual undercut 131 includes a first exterior groove 131a that is concave inwardly and a second exterior groove 131b that is concave more inwardly from the first exterior groove 131a. The second exterior dual undercut 132 includes a first exterior groove 132a that is concave inwardly and a second exterior groove 132b that is concave more inwardly from the first exterior groove 132a. The third exterior dual undercut 133 includes a first exterior groove 133a that is concave inwardly and a second exterior groove 133b that is concave more inwardly from the first exterior groove 133a.

The corner protrusion 161 is disposed in an upper portion of the first exterior dual undercut 131 and contacts a bottom of a first exterior dual undercut 131 of the tray 300 that is stacked above.

In addition, the corner protrusion 163 is disposed in an upper portion of the second exterior dual undercut 132 and contacts a bottom of a second exterior dual undercut 132 of the tray 300 that is stacked above. A bottom of the third exterior dual undercut 133 is supported by a tray 300 that is stacked below by contacting an upper surface of the tray 300.

Interior grooves 135 and 136 are provided in the third interior wall 130a, and the interior grooves 135 and 136 have bottoms that are inclined to an outer side with respect to the third interior wall 130a. The interior groove 135 is disposed between the first support wall 110 and the partition 150, and the interior groove 136 is disposed between the second support wall 120 and the partition 150.

Third interior undercuts 137 and 138 are provided in the third interior wall 130a, and the third interior undercut 137 is provided in a lower portion of the interior groove 135 while the third interior undercut 138 is provided in a lower portion of the interior groove 136. Accordingly, the third interior undercut 137 is disposed between the first support wall 110 and the partition 150, and the third interior undercut 138 is disposed between the second support wall 120 and the partition 150. A bottom of each of the third interior undercuts 137 and 138 is supported by an upper surface of the tray that is stacked below.

The fourth support wall 140 includes a fourth interior wall 140a and a fourth exterior wall 140b, and the fourth interior wall 140a and the fourth exterior wall 140b are connected with each other through upper surfaces thereof. The fourth interior wall 140a and the fourth exterior wall 140b face each other, and the fourth exterior wall 140b is disposed further outside than the fourth interior wall 140a.

A plurality of exterior dual undercuts are provided in the fourth exterior wall 140b, and a first exterior dual undercut 141, a second exterior dual undercut 142, and a third exterior dual undercut 143 are provided in the fourth exterior wall 140b. The third exterior dual undercut 143 is disposed between the first exterior dual undercut 141 and the second exterior dual undercut 142.

The first exterior dual undercut 141 includes a first exterior groove 141a that is concave inwardly and a second exterior groove 141b that is concave more inwardly from the first exterior groove 141a. The second exterior dual undercut 142 includes a first exterior groove 142a that is concave inwardly and a second exterior groove 142b that is concave more inwardly from the first exterior groove 142a. The third exterior dual undercut 143 includes a first exterior groove 143a that is concave inwardly and a second exterior groove 143b that is concave more inwardly from the first exterior groove 143a.

The corner protrusion 162 is provided in an upper portion of the first exterior dual undercut 141, and contacts a bottom of a first exterior dual undercut 141 of a tray 300 disposed thereabove.

In addition, the corner protrusion 164 is provided in an upper portion of the second exterior dual undercut 142, and contacts a bottom of a second exterior dual undercut 142 of the tray 300 that is stacked above. A bottom of the third exterior dual undercut 143 is supported by a tray 300 disposed therebelow by contacting an upper surface of the tray 300 that is stacked below.

Interior grooves 145 and 146 are provided in the fourth interior wall 140a, and the interior grooves 145 and 146 have bottoms that are inclined to the outside with respect to the fourth interior wall 140a. The interior groove 145 is disposed between the first support wall 110 and the partition 150, and the interior groove 146 is disposed between the second support wall 120 and the partition 150.

Fourth interior undercuts 147 and 148 are provided in the fourth interior wall 140a, and the fourth interior undercut 147 is provided in a lower portion of the interior groove 145 while the fourth interior undercut 148 is provided in a lower portion of the interior groove 146. Thus, the fourth interior undercut 147 is disposed between the first support wall 110 and the partition 150, and the fourth interior undercut 148 is disposed between the second support wall 120 and the partition 150. Bottoms of the fourth interior undercuts 147 and 148 are supported by an upper surface of a fourth support wall 140 of the tray 300 that is stacked below.

The partition 150 divides spaces by connecting the third support wall 130 and the fourth support wall 140, and is disposed in parallel with the first support wall 110 and the second support wall 120. A third protrusion 173 protruding toward the first support wall 110 and a fourth protrusion 174 protruding toward the second support wall 120 are provided in the partition 150.

A single third protrusion 173 is provided in the partition 150, and the third protrusion 173 protrudes while facing the first protrusion 171 and is disposed in parallel with the first protrusion 171. In addition, a single fourth protrusion 174 is provided in the partition 150, and is disposed in parallel with the second protrusion 172 while facing the second protrusion 172. The third protrusion 173 and the fourth protrusion 174 protrude from different surfaces of the partition 150. The third protrusion 173 and the first protrusion 171 are distanced from each other, and the fourth protrusion 174 is distanced from the second protrusion 172.

A middle undercut 176 is provided only in a side of third protrusion 173, which faces the third support wall 130, and a middle undercut 178 is provided only in a surface of the fourth protrusion 174, which faces the third support wall 130. That is, the middle undercut 176 is provided only in one side of the third protrusion 173, and the middle undercut 178 is provided only in one side of the fourth protrusion 174. A bottom of the middle undercut 176 is supported by an upper surface of a third protrusion 173 of the below-disposed tray 300, and a bottom of the middle undercut 178 is supported by an upper surface of a fourth protrusion 174 of the tray 300 that is stacked below.

In the partition 150, a first center dual undercut 151 is disposed between the third protrusion 173 and the third support wall 130 while a second center dual undercut 152 is disposed between the fourth protrusion 174 and the fourth support wall 140. Since the first center dual undercut 151 and the second center dual undercut 152 are formed in different sides, the first center dual undercut 151 is formed in a side that faces the first support wall 110 and the second center dual undercut 152 is formed in a side that faces the second support wall 120.

The first center dual undercut 151 includes a first interior groove 151a that is concave inwardly and a second interior groove 151b that is concave more inwardly from the first interior groove 151a. An upper end of the second interior groove 151b is lower than an upper end of the first interior groove 151a, and a bottom of the second interior groove 151b is connected with a bottom of the first interior groove 151a. The first interior groove 151a has a depth that is gradually increased downward, and the second interior groove 151b has a depth that is gradually increased downward. Accordingly, the bottom of the first center dual undercut 151 protrudes in a sideward direction.

A first interior protrusion 153 protrudes from an upper portion of the first center dual undercut 151, and a first receiving groove 154 where a bottom a first center dual undercut 151 of the tray 300 that is stacked above is inserted is provided in the first interior protrusion 153. The first receiving groove 154 has opened sides that respectively face above and the first support wall 110.

The second center dual undercut 152 includes a first interior groove 152a that is concave inwardly and a second interior groove 152b that is concave more inwardly from the first interior groove 152a. An upper end of the second interior groove 152b is lower than an upper end of the first interior groove 152a, and a bottom of the second interior groove 152b is connected with a bottom of the first interior groove 152a. The first interior groove 152a has a depth that is gradually increased downward, and the second interior groove 152b has a depth that is gradually increased downward. Accordingly, the bottom of the second center dual undercut 152 protrudes in a sideward direction.

A second interior protrusion 155 protrudes from an upper portion of the second center dual undercut 152, and a second receiving groove 156 where a bottom of a second center dual undercut of the tray 300 that is stacked above is inserted is provided in the second interior protrusion 155. The second receiving groove 156 has opened sides that respectively face above and the second support wall 120.

As described above, the first receiving groove 154 is opened toward the first support wall 110 and the second receiving groove 156 is opened toward the second support wall 120, and therefore, when the center dual undercuts of the tray stacked above are supported by the receiving grooves, a load of the tray can be dispersed and the interior grooves support the tray 300 in lateral directions so that the tray 300 can be placed in a desired location.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

-Description of Symbols-

100: tray  
10: first support wall  
11, 21, 31: first exterior dual undercut  
12, 22, 32: second exterior dual undercut 22

-continued

-Description of Symbols- 13, 23, 33: third exterior dual undercut
14, 15, 16, 24, 25, 26: interior groove
17: first exterior undercut
30: third support wall
50: partition
35, 45, 78: support protrusion
52: second center dual undercut
61, 62, 63, 64: corner protrusion
71: first protrusion
73: third protrusion
20: second support wall
40: fourth support wall
27, 28: second interior undercut
51: first center dual undercut
53: third center dual undercut
65, 66: middle protrusion
72: second protrusion
74: fourth protrusion

The invention claimed is:

1. A battery tray where a plurality of rechargeable batteries are received, the battery tray comprising:
a first support wall and a second support wall that are disposed facing each other;
a third support wall and a fourth support wall disposed facing each other, which connect an end of the first support wall and an end of the second support wall to each other; and
a partition extending between an inner side of the third support wall and an inner side of the fourth support wall,
wherein:
the first support wall includes a pair of first protrusions that protrude from the first support wall toward the second support wall, and a first interior undercut is provided in the first support wall between the first protrusions,
the second support wall includes a pair of second protrusions with a space therebetween, the pair of second protrusions being aligned with and protruding toward the pair of first protrusions, and a pair of second interior undercuts is provided in the second support wall, the pair of second protrusions and the space being interposed between the second interior undercuts,
the second support wall does not include an undercut in the space such that the first interior undercut and the second interior undercuts are asymmetrically disposed with reference to the partition, and
the partition extending between the inner side of the third support wall and the inner side of the fourth support wall includes at least one dual undercut that faces the first support wall, the dual undercut including a first concave groove and a second concave groove within the first concave groove such that an upper end of the second concave groove is lower than an upper end of the first concave groove, the second concave groove being more concave than the first interior groove, a bottom of the dual undercut protruding toward the second support wall.

2. The battery tray of claim 1, wherein a third interior undercut is provided in the third support wall, a fourth interior undercut is provided in the fourth support wall, and the third interior undercut and the fourth interior undercut are symmetrical to each other with reference to a virtual line that perpendicularly passes the partition at the center of the partition.

3. The battery tray of claim 2, wherein a pair of third interior undercuts is provided in the third support wall, and one of the pair of third interior undercuts is disposed between the first support wall and the partition, and the other of the pair of third interior undercuts is disposed between the second support wall and the partition.

4. The battery tray of claim 3, wherein a pair of fourth interior undercuts is provided in the fourth support wall, and one of the pair of fourth interior undercuts is disposed between the first support wall and the partition, and the other of the pair of fourth interior undercuts is disposed between the second support wall and the partition.

5. The battery tray of claim 1, wherein the pair of first protrusions partitions spaces where batteries are inserted.

6. The battery tray of claim 5, wherein:
a pair of third protrusions is provided in sides of the partition to face the pair of first protrusions, and
the at least one dual undercut includes a first center dual undercut provided between one of the pair of third protrusions, and the third support wall, and a second center dual undercut provided between the other of the pair of third protrusion and the fourth support wall.

7. The battery tray of claim 6, wherein:
a support groove, configured to receive a bottom of a first center dual undercut of another identical battery tray that is stacked above, is provided in an upper portion of the first center dual undercut, and
another support groove, configured to receive a bottom of a second center dual undercut of the other identical battery tray stacked above, is provided in an upper portion of the second center dual undercut.

8. The battery tray of claim 6, wherein the pair of second protrusions partitions spaces where batteries are inserted, and one of the pair of second interior undercuts is disposed between one of the pair of second protrusions and the third support wall, and the other of the pair of second interior undercuts is disposed between the other of the pair of second protrusions and the fourth support wall.

9. The battery tray of claim 8, wherein a pair of fourth protrusions that faces the pair of second protrusions is provided in a side of the partition that faces the second support wall, the pair of fourth protrusions having a third center dual undercut therebetween.

10. The battery tray of claim 9, wherein a support groove, which is configured to receive a bottom of a third center dual undercut of another identical battery tray that is stacked above, is provided in an upper portion of the third center dual undercut.

11. The battery tray of claim 9, wherein the third support wall, the fourth support wall, the first protrusions, the second protrusions, the third protrusions, and the fourth protrusions are each configured to contact side surfaces of batteries disposed in the battery tray.

12. The battery tray of claim 1, wherein a third protrusion that faces one of the pair of first protrusions is provided in a side of the partition, which faces the first support wall, and a center dual undercut is provided between the third protrusion and the third support wall.

13. The battery tray of claim 12, wherein a fourth protrusion that faces one of the pair of second protrusions is provided in a side of the partition, which faces the second support wall, and a second center dual undercut is provided between the fourth protrusion and the fourth support wall.

14. The battery tray of claim 13, wherein a support groove, which is configured to receive a bottom of a center dual undercut of another identical battery tray that is stacked above, is provided in an upper portion of the second center dual undercut.

15. The battery tray of claim 1, wherein a plurality of center support grooves are provided in the partition, and the center support grooves are provided at upper ends of lateral sides of the partition and are asymmetrical to each other with reference to the center of the partition.

16. The battery tray of claim 1, wherein the first support wall comprises a first interior wall and a first exterior wall, the first interior undercut is provided in the first interior wall, a plurality of first exterior dual undercuts are provided in the first exterior wall, and corner protrusions are provided in upper portions of the first exterior dual undercuts.

17. The battery tray of claim 16, wherein the corner protrusions are connected from an upper surface of the first support wall to an upper surface of the third support wall.

* * * * *